M. HENDERSON.
Car Brake and Starter.
No. 78,371. Patented May 26, 1868.
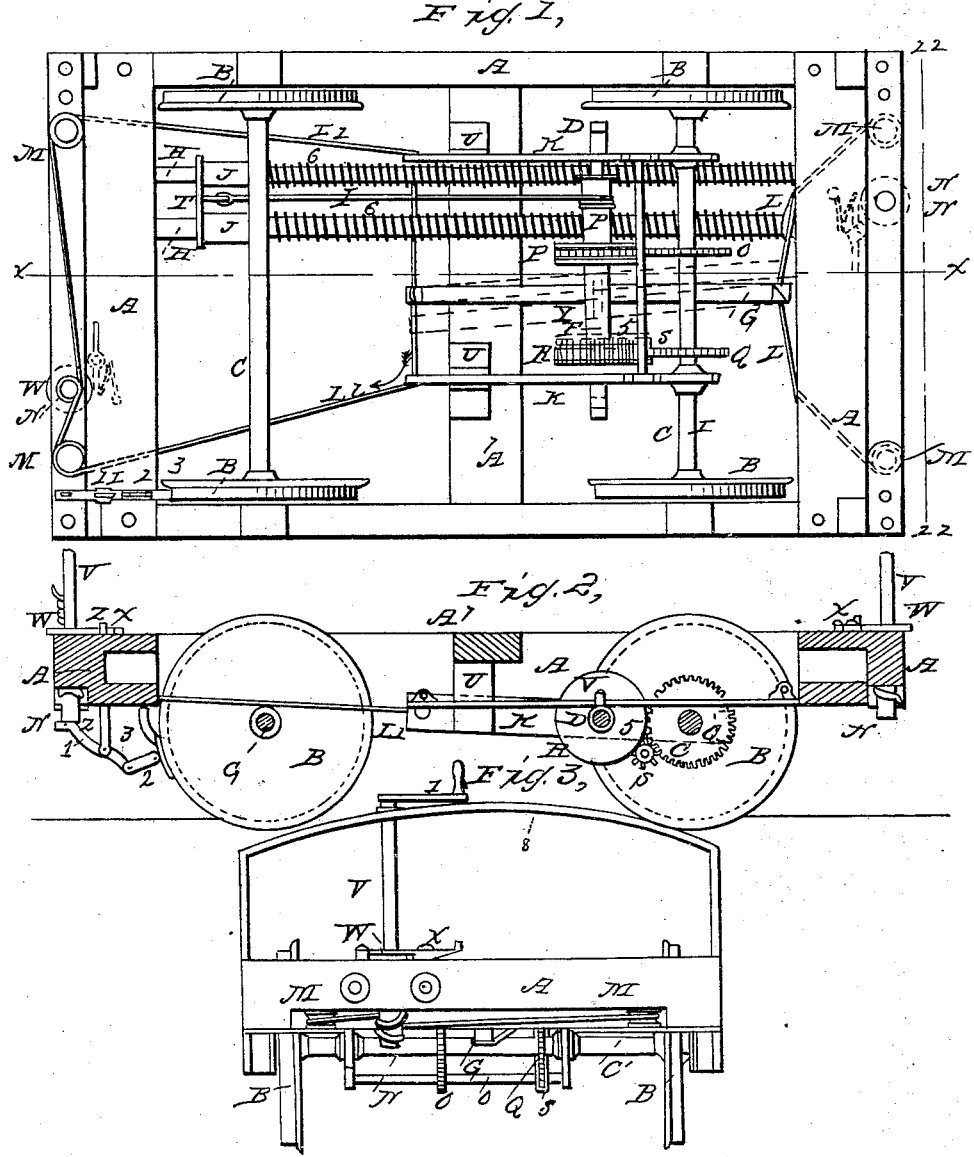

United States Patent Office.

MICHAEL HENDERSON, OF DETROIT, MICHIGAN.

*Letters Patent No. 78,371, dated May 26, 1868.*

IMPROVED CAR-BRAKE AND STARTER.

*The Schedule referred to in these Letters Patent and making part of the same.*

TO WHOM IT MAY CONCERN:

Be it known that I, MICHAEL HENDERSON, of Detroit, in the county of Wayne, and State of Michigan, have invented a new and useful Improvement in Apparatus for Starting and Stopping Cars; and do declare that the following is a true and accurate description thereof, reference being had to the accompanying drawings, and to the letters of reference marked thereon, and being a part of this specification.

Figure 1 is a bottom view of the car and the apparatus thereto attached.

Figure 2 is a sectional view of the car, taken longitudinally from $x$ to $x$.

Figure 3 is a transverse view of the same from 2 2 to 2 2.

The same letters indicate like parts in each figure.

This invention consists in attaching certain mechanism, composed of shafts, gears, springs, rods, and cords or chains, in such a manner as, when in gear and working order, to overcome the inertia of the car, and move it forward, thereby avoiding a very large proportion of the sudden strain usually thrown upon the power employed to start and propel the car. The mechanism is so arranged that it accumulates its power directly from the weight and momentum of the car in stopping, and by proper devices is held in check until required.

In order that those skilled in the art may be able to understand this invention, I will now proceed to describe and name its various parts, as shown in the drawings.

B are the car-wheels, connected in pairs by axles C, upon which is surmounted the frame A, the axle C' being provided with cog-wheels, firmly secured to the same, and placed in position to gear with intermediate pinion S and wheel R, pinion S engaging to and with the wheel R, thereby transmitting the same motion from axle C' to shaft D, to which are firmly secured the wheels P and R. The shafts D and O O, provided at their ends with boxes attached to longitudinal bars K, suspended to transverse sill A 7 by hangers U, and supported upon axle C', which is provided with proper boxes for the same.

The shaft D is provided at its ends with extended journals, to admit of a longitudinal reciprocating motion, for the purpose of changing of motion between axle C' and shaft D, by placing in gear wheels P and O, or R Q, and pinion S, according to the direction of motion required, which operation is performed by sleeve F, placed loosely on shaft D, between wheels P and R, to which is loosely pivoted the shifting-bar G, obtaining its motion by lines L, secured at its ends, passing, in their course, to cylinders N, which are operated by crank 7, and secured in the desired position by ratchets W and pawl X.

The longitudinal rods H are secured at their ends to end-sills of the car by bolts 9, upon which are placed compression spiral springs 6, connected, as hereafter described, to the cylinder E, retaining the momentum in stopping by the compression of the same, held in position while standing, and released at will, when required, to start the car, through sleeves J, connected by bar T, and line or chain I, wound around the cylinder E, all operating as follows: The position of the wheels, as represented in drawings, being all in gear, locking the same, as to motion, by the intermediate pinion S, reversing the motion that would otherwise be transmitted from wheel O to P, by moving the shaft D longitudinally either way, will release the gearing, and allow the same to rotate freely, which must be the case during the use of the car when the apparatus is not required for stopping or starting.

The face of the pinion S being twice the width of the other wheels, will admit of its being in gear with wheel Q simultaneously with wheels P and Q, as shown in fig. 1, but by gearing with wheel Q it transmits the same motion to shaft D with axle C 1, at the same time winding the line or chain I upon cylinder E, compressing the spiral springs 6, and accumulating the necessary power in stopping the car to be transferred to the opposite direction of motion with shaft D, by placing in gear the wheels O and P, transferring the power to an opposite or forward motion, through wheels P and O, with axle C 1, all operated by the change-bar G, the lines or chains L, the winches 7 secured in the desired position, and operated as above described.

To assist the driver in regulating the motion of the car, in stopping it instantly, when required, or checking the motion, I provide the same with brakes at each end, as at the left-hand end of fig. 2, constructed as follows: The brake-shoe 3 is suspended to the bottom of the car, and hinged thereto, connected to lever 1 by rod 2, suspended by hanger Z, and operated by the stem 4 passing through the framework, and extending above the floor in position to be operated upon by the foot, the whole retained in proper position, when not in operation, by a spiral spring around the top end of the stem 4, between the projecting cap and floor or plate, giving the driver perfect control of the car, as to the motion, by the use of the brake, in connection with spiral spring 6, and apparatus thereto connected.

What I claim as my invention, and desire to secure by Letters Patent, is—

The longitudinal bars K, shafts D and O, when connected with the bar G, and operated by the lines or chains L, secured by ratchets and pawls X, substantially as and for the purposes set forth.

Also, the combination of the above-named parts with the parallel longitudinal rods H, provided with spiral springs 6, sleeves J, and connecting-bar T, the line or chain I, cylinder E, and shifting-bar G, when arranged and operating substantially as herein set forth.

MICHAEL HENDERSON.

Witnesses:
H. S. SPRAGUE,
J. W. HOUGHTELIN.